United States Patent
Miki et al.

(10) Patent No.: US 12,438,395 B2
(45) Date of Patent: Oct. 7, 2025

(54) WIRELESS POWER TRANSFER SYSTEM

(71) Applicant: Murata Manufacturing Co., Ltd., Kyoto-fu (JP)

(72) Inventors: Osamu Miki, Nagaokakyo (JP); Tatsuya Hosotani, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 177 days.

(21) Appl. No.: 18/068,459

(22) Filed: Dec. 19, 2022

(65) Prior Publication Data

US 2023/0124799 A1 Apr. 20, 2023

Related U.S. Application Data

(63) Continuation of application No. PCT/JP2021/004031, filed on Feb. 4, 2021.

(30) Foreign Application Priority Data

Jun. 30, 2020 (JP) ................... 2020-112478

(51) Int. Cl.
*H02J 50/12* (2016.01)
*H02J 50/40* (2016.01)
*H02J 50/90* (2016.01)

(52) U.S. Cl.
CPC ............ *H02J 50/12* (2016.02); *H02J 50/402* (2020.01); *H02J 50/90* (2016.02)

(58) Field of Classification Search
CPC .......... H02J 50/12; H02J 50/402; H02J 50/90; H02J 50/40
See application file for complete search history.

(56) References Cited

U.S. PATENT DOCUMENTS

| 6,934,167 B2 * | 8/2005 | Jang ........................ | H02J 50/70 |
| | | | 363/21.02 |
| 7,126,450 B2 * | 10/2006 | Baarman ................. | H02J 50/10 |
| | | | 315/276 |

(Continued)

FOREIGN PATENT DOCUMENTS

| JP | 2011-199975 A | 10/2011 |
| JP | 2015-223031 A | 12/2015 |

(Continued)

OTHER PUBLICATIONS

International Search Report issued in PCT/JP2021/004031; mailed Apr. 6, 2021.

*Primary Examiner* — Hal Kaplan
*Assistant Examiner* — Brian K Baxter
(74) *Attorney, Agent, or Firm* — Studebaker Brackett PLLC (57) ABSTRACT

A wireless power transfer system includes a power transmission circuit that includes power transmission resonance mechanisms including power transmission coils and power transmission resonant capacitors, and a power reception circuit that includes a power reception resonance mechanism including a power reception coil that magnetically couples to the power transmission coils and a power reception resonant capacitor. The power transmission circuit includes a square wave power supply circuit including a direct-current power supply and a switching circuit, the power transmission resonance mechanisms and the power reception resonance mechanism form electromagnetic resonance coupling, and the power reception resonance mechanism acquires reception power by superposing resonance currents induced by the electromagnetic resonance coupling.

17 Claims, 7 Drawing Sheets

(56) References Cited

U.S. PATENT DOCUMENTS

| | | | | |
|---|---|---|---|---|
| 7,696,644 B2* | 4/2010 | Metz | | H01F 38/14 |
| | | | | 219/203 |
| 8,432,070 B2* | 4/2013 | Cook | | H01Q 7/00 |
| | | | | 307/150 |
| 8,729,734 B2* | 5/2014 | Cook | | H01F 38/14 |
| | | | | 307/104 |
| 8,729,735 B2* | 5/2014 | Urano | | H02J 50/12 |
| | | | | 307/104 |
| 9,543,766 B2* | 1/2017 | Kim | | H02J 50/12 |
| 9,742,222 B1* | 8/2017 | Xu | | H02J 50/402 |
| 9,774,086 B2* | 9/2017 | Cook | | H01Q 7/005 |
| 10,511,194 B2* | 12/2019 | Hosotani | | H02M 3/33576 |
| 10,608,472 B2* | 3/2020 | Lee | | H05B 6/1236 |
| 11,146,112 B1* | 10/2021 | Luo | | H02M 7/5387 |
| 2009/0289505 A1* | 11/2009 | Baumann | | B60L 53/38 |
| | | | | 307/104 |
| 2012/0025623 A1* | 2/2012 | Low | | H02J 50/90 |
| | | | | 307/104 |
| 2012/0106103 A1* | 5/2012 | Nohra | | H02J 50/001 |
| | | | | 361/752 |
| 2012/0161541 A1* | 6/2012 | Urano | | H02J 50/40 |
| | | | | 307/104 |
| 2012/0319646 A1* | 12/2012 | Kamata | | H02J 7/04 |
| | | | | 320/108 |
| 2013/0093258 A1* | 4/2013 | Lee | | H01F 38/14 |
| | | | | 307/104 |
| 2013/0099587 A1* | 4/2013 | Lou | | H02J 3/381 |
| | | | | 307/104 |
| 2015/0214788 A1* | 7/2015 | Hosotani | | H02J 50/12 |
| | | | | 307/104 |
| 2016/0181870 A1* | 6/2016 | Bae | | H02J 50/005 |
| | | | | 307/104 |
| 2016/0243949 A1* | 8/2016 | Merkel | | H02J 50/90 |
| 2017/0214278 A1* | 7/2017 | Hosotani | | H02J 50/70 |
| 2018/0323655 A1* | 11/2018 | Hosotani | | H01F 38/14 |
| 2019/0115789 A1* | 4/2019 | Sugiyama | | H04B 5/79 |
| 2020/0153286 A1* | 5/2020 | Mao | | H02J 50/12 |
| 2022/0060043 A1* | 2/2022 | Hao | | H02J 50/402 |
| 2022/0385108 A1* | 12/2022 | Kamata | | H02J 50/90 |
| 2024/0356336 A1* | 10/2024 | Kuznetsov | | B63G 8/001 |

FOREIGN PATENT DOCUMENTS

| | | |
|---|---|---|
| JP | 2017-028998 A | 2/2017 |
| JP | 2018-102092 A | 6/2018 |

* cited by examiner

WIRELESS POWER TRANSFER SYSTEM

CROSS-REFERENCE TO RELATED APPLICATIONS

This application claims benefit of priority to International Patent Application No. PCT/JP2021/004031, filed Feb. 4, 2021, and to Japanese Patent Application No. 2020-112478, filed Jun. 30, 2020, the entire contents of each are incorporated herein by reference.

BACKGROUND

Technical Field

The present disclosure relates to a wireless power transfer system that includes a power transmission circuit and a power reception circuit.

Background Art

Japanese Unexamined Patent Application Publication No. 2018-102092 discloses a wireless power transmission system that realizes highly efficient power transmission when a power transmission device and a power-receiving device have a freely chosen positional relationship. The system according to Japanese Unexamined Patent Application Publication No. 2018-102092 includes a power transmission device having transmission-side resonance circuits including coils and reactance circuits and an alternating current (AC) power supply for supplying power to each transmission-side resonance circuit, and a power reception device having a power-reception side resonance circuit including a coil and a reactance circuit and a load circuit of the power-reception side resonance circuit. In the system, the transmission-side resonance circuits are resonance-coupled to the power-reception side resonance circuit, so that power is transmitted from the AC power supply to the load circuit by wireless. The reactance of each reactance circuit takes a value determined based on a power transmission efficiency calculated using a circuit equation which represents the power transmission device and the power reception device and in which a self-inductance of each coil and mutual inductances between the coils are used as constants, and each reactance is handled as a variable, the self-inductances and the mutual inductances being obtained in a case where the power transmission device and the power reception device are arranged so as to have a predetermined positional relationship.

SUMMARY

As one system for wireless power transfer, for example, there is a technology for wirelessly charging a dry-battery-shaped secondary battery. Electrical specifications of the charging current are equal to those of a case where charging is performed in a wired manner. Charging current having such electrical specifications is supplied to a small power reception coil that fits in a dry-battery size, and thus a technology is necessary in which power can be received with a high degree of power efficiency by using a convenient, simple configuration.

In resonance wireless power transfer in which a power transmission resonance mechanism and a power reception resonance mechanism resonate using a direct-current power supply, that is, direct-current wireless power transfer, in order to increase reception power, it is generally necessary to adjust the resonant frequency of the power transmission resonance mechanism to an appropriate value and increase a resonance current flowing thorough the power transmission resonance mechanism.

In general, in order to increase reception power, there is a technology in which a power transmission resonance current is increased by, for example, increasing a power supply voltage on the power transmission side. However, when the power supply voltage is increased, the voltage stress increases in a power semiconductor device such as a switching element that is included in a power circuit, and the pressure resistance of the switching element needs to be increased. This results in problems in that the size of the power semiconductor device is increased, the power loss increases, and the reliability decreases due to the voltage stress.

Moreover, when the power transmission resonance current is increased, heat generated by the power transmission coil increases, so that the equivalent impedance needs to be reduced by increasing the effective area by increasing the conductor width or conductor thickness of the power transmission coil. Furthermore, when the power transmission resonance current is increased, not only the voltage applied to the power transmission coil but also the voltage applied to, for example, the power transmission resonant capacitor increases, so that power loss at components that constitute the resonant circuit also increases, and heat generation and an increase in component size become problems.

Accordingly, the present disclosure provides a wireless power transfer system that allows, in direct-current wireless power transfer, a large amount of power to be transmitted and a large amount of power to be received without increasing the voltage of a direct-current power supply on the power transmission side and also without increasing a power transmission resonance current.

A wireless power transfer system as one example of the present disclosure includes a power transmission circuit that includes a power transmission resonance mechanism including a power transmission coil and a power transmission resonant capacitor; and a power reception circuit that includes a power reception resonance mechanism including a power reception coil that magnetically couples to the power transmission coil and a power reception resonant capacitor. The wireless power transfer system wirelessly supplies power from the power transmission coil to the power transmission coil. Also, a power transmission circuit is formed in the wireless power transfer system by connecting, in parallel, a plurality of power transmission resonance mechanisms including the power transmission resonance mechanism. The power transmission circuit includes a direct-current power supply and a switching circuit, and direct-current power from the direct-current power supply is intermittently and periodically supplied, using the switching circuit, to the plurality of power transmission resonance mechanisms. The plurality of power transmission resonance mechanisms and the power reception resonance mechanism form electromagnetic resonance coupling, and the power reception resonance mechanism acquires reception power by superposing resonance currents induced by the electromagnetic resonance coupling generated by the plurality of power transmission resonance mechanisms.

According to the present disclosure, a wireless power transfer system is obtained that can, in resonance wireless power transfer, transmit and receive large amounts of power without increasing the voltage of a direct-current power supply on the power transmission side, without increasing a power transmission resonance current, with a simple configuration, and without increasing the sizes of the components of a power circuit.

DETAILED DESCRIPTION

Hereinafter, a plurality of embodiments for realizing the present disclosure will be described with reference to the drawings by taking for example some specific examples. In the individual drawings, the same portions will be denoted by the same reference numerals. By considering the ease of description or understanding of main points, for convenience' sake in terms of description of embodiments, the present disclosure will be described using a plurality of embodiments; however, some of the configurations illustrated in the different embodiments can be replaced or combined with each other. In the second and subsequent embodiments, description of the same matters as those of the first embodiment will be omitted, and only different points from the first embodiment will be described. In particular, substantially the same operational effects due to substantially the same configurations will not be mentioned in detail in every embodiment.

First Embodiment

Figure 1:
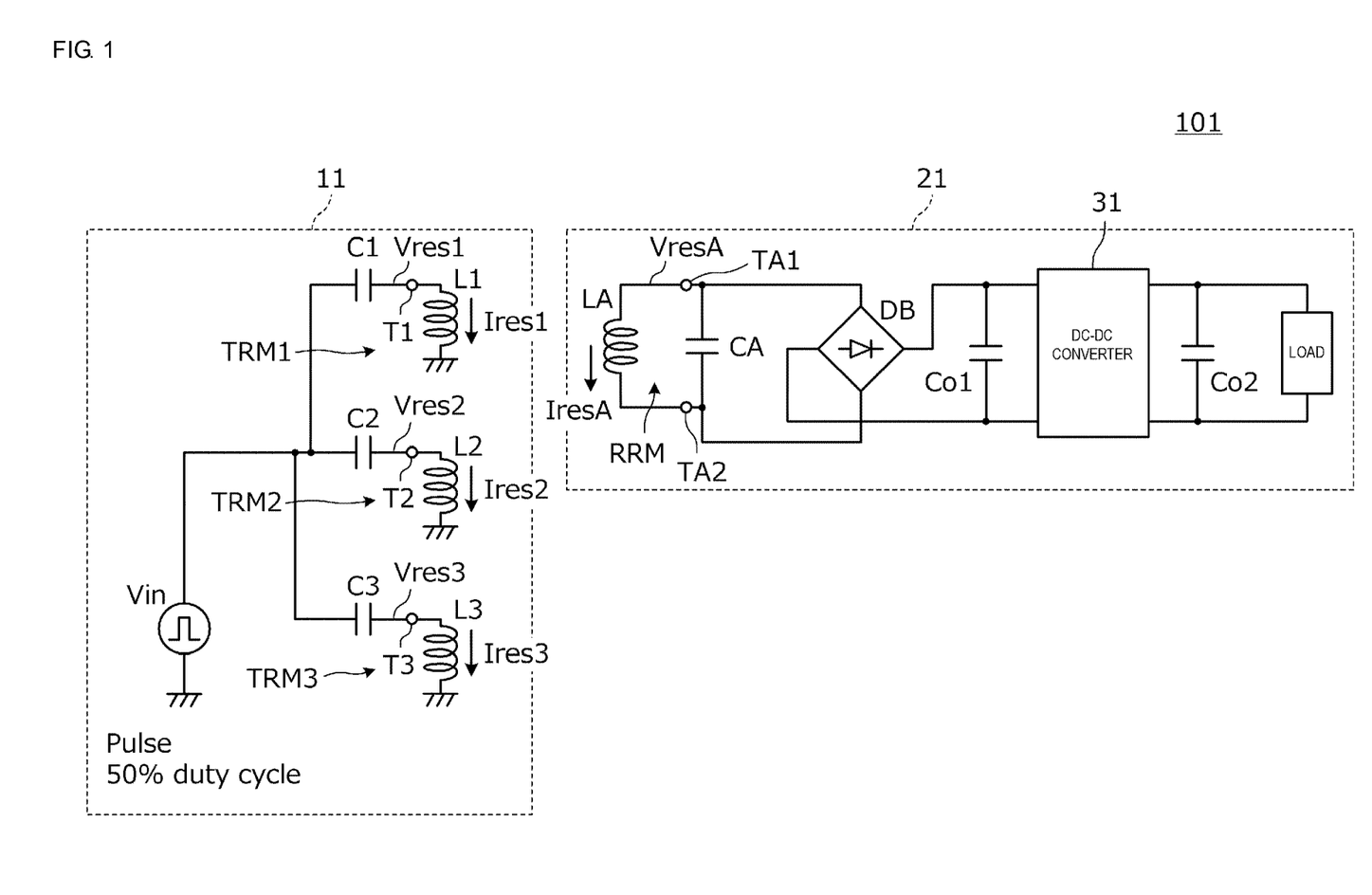
FIG. 1 is a circuit diagram of a wireless power transfer system according to a first embodiment.

FIG. 1 is a circuit diagram of a wireless power transfer system 101 according to the first embodiment. The wireless power transfer system 101 includes a power transmission circuit 11 and a power reception circuit 21. The power transmission circuit 11 has power transmission resonance mechanisms TRM1, TRM2, and TRM3. The power transmission resonance mechanisms TRM1, TRM2, and TRM3 include power transmission coils L1, L2, and L3 and power transmission resonant capacitors C1, C2, and C3. Terminals T1, T2, and T3 of the power transmission coils L1, L2, and L3 will be described later. The power reception circuit 21 has a power reception resonance mechanism RRM, which includes a power reception coil LA and a power reception resonant capacitor CA. The power reception coil LA magnetically couples to the power transmission coils L1, L2, and L3. Terminals TA1 and TA2 of the power reception coil LA will be described later. The wireless power transfer system 101 is a system that wirelessly supplies power from the power transmission coils L1, L2, and L3 to the power reception coil LA.

In this example, the three power transmission resonance mechanisms TRM1, TRM2, and TRM3 form a parallel connection circuit. The power transmission circuit 11 has a square wave power supply circuit Vin, which generates square wave voltage (supplies square wave power). The square wave power supply circuit Vin includes a direct-current power supply and a switching circuit, which performs switching of the direct-current power supply. That is, the switching circuit intermittently and periodically applies a direct-current voltage to the plurality of power transmission resonance mechanisms TRM1, TRM2, and TRM3. The switching circuit determines a switching frequency on the basis of a clock signal generated by, for example, a crystal resonator or the like.

All of the power transmission resonance mechanisms TRM1, TRM2, and TRM3 resonate at the switching frequency of the switching circuit. As a result, a resonance voltage Vres1 is generated at the power transmission resonance mechanism TRM1, and a resonance current Ires1 flows. Similarly, a resonance voltage Vres2 is generated at the power transmission resonance mechanism TRM2, and a resonance current Ires2 flows. A resonance voltage Vres3 is generated at the power transmission resonance mechanism TRM3, and a resonance current Ires3 flows.

The plurality of power transmission resonance mechanisms TRM1, TRM2, and TRM3 and the power reception resonance mechanism RRM form electromagnetic resonance coupling. A resonance current IresA flows through the power reception resonance mechanism RRM, and a resonance voltage VresA is generated. The resonant frequency of the power reception resonance mechanism RRM is the above-described switching frequency. As a result, the power reception resonance mechanism RRM acquires reception power obtained by superposing resonance currents induced by electromagnetic resonance coupling.

The power reception circuit 21 includes the above-described power reception resonance mechanism RRM, a diode bridge DB, smoothing capacitors Co1 and Co2, a direct current to direct current (DC-DC) converter 31, and a load. The diode bridge DB forms a rectifier circuit.

The diode bridge DB performs rectification by receiving the voltage of a parallel resonant circuit formed by the power reception coil LA and the power reception resonant capacitor CA of the power reception resonance mechanism RRM.

The smoothing capacitor Co1 smooths the rectified voltage from the diode bridge DB. The DC-DC converter 31 converts a receiving voltage, which changes on the basis of layout, into a certain constant voltage, and the smoothing capacitor Co2 smooths the output from the DC-DC converter 31. In this manner, a predetermined direct-current voltage is supplied to the load.

Figure 2:
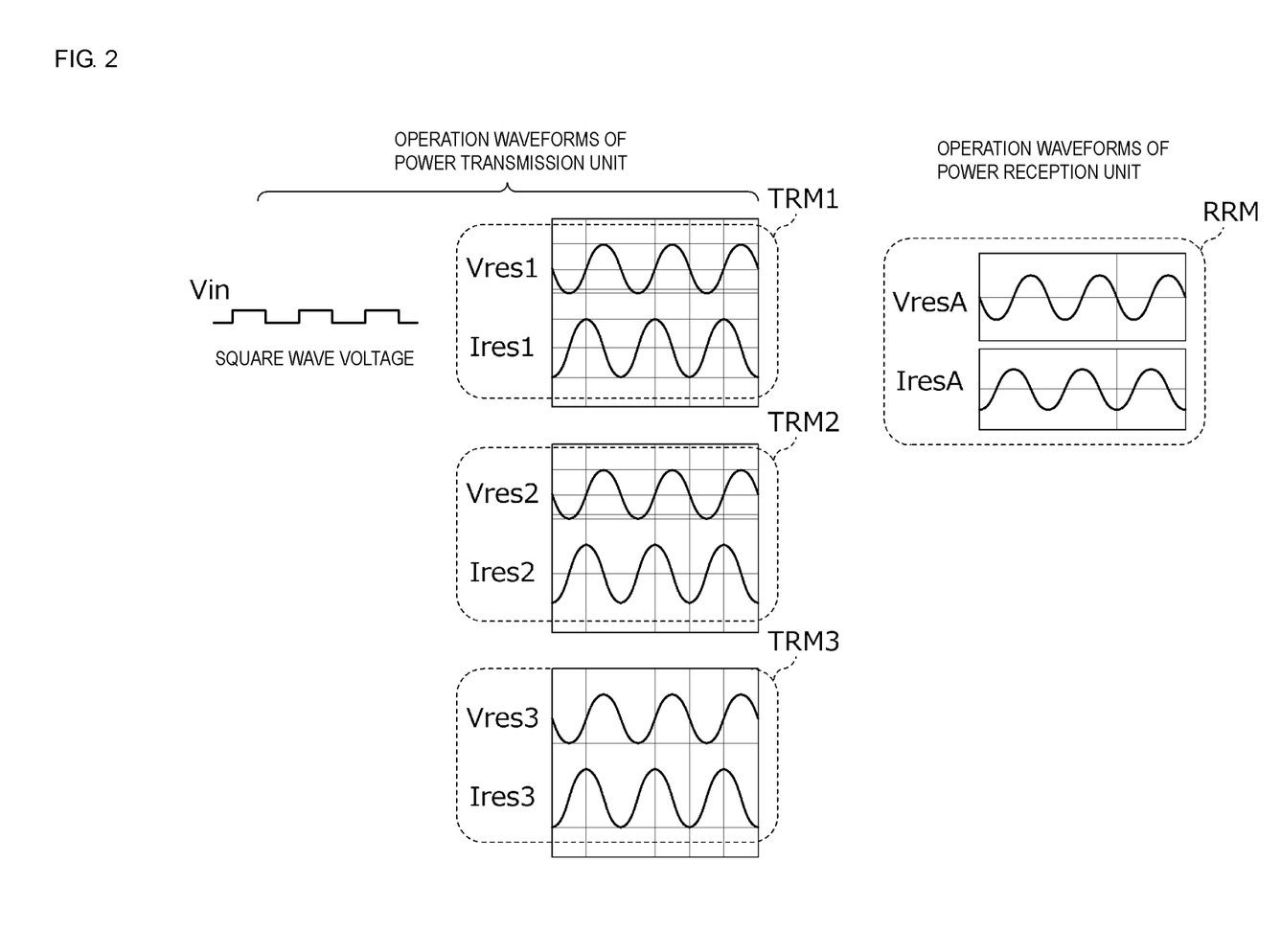
FIG. 2 is a diagram illustrating waveforms at various units of the wireless power transfer system illustrated in FIG. 1.

FIG. 2 is a diagram illustrating waveforms at various units of the wireless power transfer system 101 illustrated in FIG. 1. The square wave power supply circuit Vin applies a square wave voltage to the power transmission resonance mechanism TRM1, so that the resonance voltage Vres1 is applied to the power transmission coil L1, and the resonance current Ires1 flows. Since the power transmission resonance mechanism TRM1 is a resonant circuit including the power transmission coil L1 and the power transmission resonant capacitor C1, the resonance current Ires1, which is a sinusoidal current, flows through the power transmission coil L1 and the power transmission resonant capacitor C1, and the resonance voltage Vres1, which is a sinusoidal voltage, is generated. There is a 90° phase difference between the resonance current and the resonance voltage.

Substantially the same operation described above applies to the power transmission resonance mechanisms TRM2 and TMR3. That is, the resonance voltage Vres2, which is a sinusoidal voltage, is applied to the power transmission coil L2, and the resonance current Ires2, which is a sinusoidal current, flows. The resonance voltage Vres3, which is a sinusoidal voltage, is applied to the power transmission coil L3, and the resonance current Ires3, which is a sinusoidal current, flows.

The power reception coil LA of the power reception resonance mechanism RRM magnetically couples to the power transmission coils L1, L2, and L3, and the power reception resonance mechanism RRM resonates. Thus, the resonance current IresA, which is a sinusoidal current, flows through the power reception coil LA, and the resonance voltage VresA, which is a sinusoidal voltage, is generated at the power reception resonance mechanism RRM. There is a 90° phase difference between the resonance current and the resonance voltage.

The power transmission resonance mechanisms TRM1, TRM2, and TRM3 and the power reception resonance mechanism RRM form electromagnetic resonance coupling. A current obtained by superposing resonance currents induced by the plurality of respective power transmission resonance mechanisms TRM1, TRM2, and TRM3 flows through the power reception resonance mechanism RRM. Thus, supply power can be increased compared with a configuration in which a single power transmission resonance mechanism is coupled to a single power reception resonance mechanism.

At least two power transmission coils among the plurality of power transmission coils L1, L2, and L3 magnetically couple to each other to form mutual inductance. For example, mutual inductance (power transmission mutual inductance) is formed by magnetic coupling between the power transmission coil L1 and the power transmission coil L2, and mutual inductance (power transmission mutual inductance) is formed by magnetic coupling between the power transmission coil L2 and the power transmission coil L3.

The power transmission resonant capacitors C1, C2, and C3 are formed by capacitors, which are electronic components. The capacitances of the power transmission resonant capacitors C1, C2, and C3 are adjusted such that electromagnetic resonance coupling is formed in accordance with magnetic coupling determined in accordance with the positional relationship between the power reception coil LA and the power transmission coils L1, L2, and L3 and the shapes of the power transmission coils L1, L2, and L3 and the power reception coil LA.

According to the present embodiment, supply power can be increased without necessity of an alternating-current power supply and also without increasing the direct-current voltage of the square wave power supply circuit Vin. Thus, the pressure resistance of the switching element that performs switching of the direct-current voltage does not need to be increased, so that an increase in the sizes of semiconductors and an increase in voltage stress can be prevented. Moreover, since the power transmission resonance currents do not increase, heat generated by the power transmission coils is not increased, and it is also unnecessary to increase the conductor width or conductor thickness of each power transmission coil. Furthermore, problems of heat generation and increased power loss in resonant elements such as the power transmission resonant capacitors due to increased power transmission resonance currents can be prevented.

Moreover, the square wave power supply circuit Vin can use a clock signal generated by, for example, a crystal resonator or the like, and the power supply voltage does not need to be set high, and thus the operating frequency of the power transmission circuit 11 can be easily increased.

Moreover, even in a case where a plurality of power transmission resonance mechanisms are formed using the capacitances of the power transmission resonant capacitors C1, C2, and C3, which are adjusted in accordance with individual coupling coefficients that affect a predetermined layout of the power transmission coils L1, L2, and L3 and the power reception coil LA, and where the position of the power reception coil LA is changed, a predetermined reception power can be obtained, in a wide change range, based on the principle of superposition.

At least one pair of power transmission coils out of the plurality of power transmission coils L1, L2, and L3 forms electromagnetic resonance coupling and forms power transmission mutual inductance. Thus, the capacitances of the power transmission resonant capacitors C1, C2, and C3 can be adjusted using the inductances of the power transmission coils L1, L2, and L3 including the power transmission mutual inductance, that is, the self-inductances of the power transmission coils L1, L2, and L3 can be reduced. Regarding the power transmission resonant capacitors C1, C2, and C3, the capacitance-based adjustable range for forming electromagnetic resonance coupling can be widen. That is, a capacitance necessary for resonance is determined on the basis of a combined inductance obtained by adding a mutual inductance to a self-inductance. Thus, as a result, a capacitor having a small capacitance can be selected as a power transmission resonant capacitor. In terms of pressure resistance, there are many capacitors having small capacitances, and there are more choices, thereby widening the adjustable range.

Second Embodiment

The second embodiment illustrates an example of a wireless power transfer system including a plurality of power reception circuits.

Figure 3:
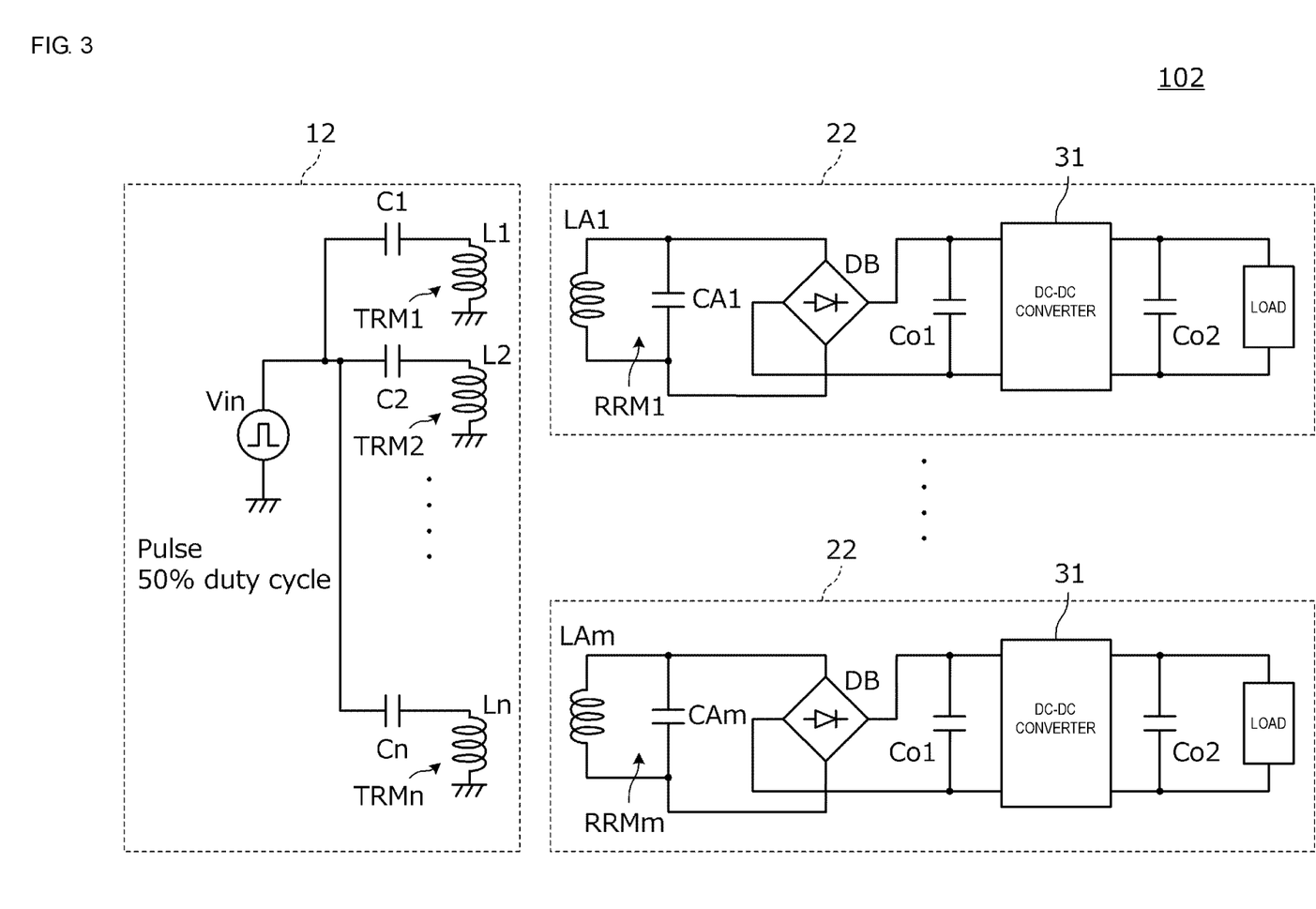
FIG. 3 is a circuit diagram of a wireless power transfer system according to a second embodiment.

FIG. 3 is a circuit diagram of a wireless power transfer system 102 according to the second embodiment. The wireless power transfer system 102 includes a power transmission circuit 12 and power reception circuits 22. The power transmission circuit 12 has power transmission resonance mechanisms TRM1, TRM2, ..., TRMn, which include power transmission coils L1, L2, ..., Ln and power transmission resonant capacitors C1, C2, ..., Cn. The power reception circuits 22 have power reception resonance mechanisms RRM1, ..., RRMm, which include power reception coils LA1, ..., LAm and power reception resonant capacitors CA1, ..., CAm. The power reception coils LA1, ..., LAm magnetically couple to the power transmission coils L1, L2, ..., Ln. The wireless power transfer system 102 is a system that wirelessly supplies power from the power transmission coils L1, L2, . . . , Ln to the power reception coils LA1, . . . , LAm.

Unlike the example illustrated in FIG. 1, the power transmission circuit 12 has three or more power transmission resonance mechanisms, which are the power transmission resonance mechanisms TRM1, TRM2, . . . , TRMn. Moreover, the power reception circuits 22 have a plurality of power reception resonance mechanisms, which are the power reception resonance mechanisms RRM1, . . . , RRMm. To each of the power reception resonance mechanisms RRM1, . . . , RRMm, a circuit that includes the diode bridge DB, the smoothing capacitors Co1 and Co2, the DC-DC converter 31, and a load are connected.

The plurality of power transmission resonance mechanisms TRM1, TRM2, . . . , TRMn and the plurality of power reception resonance mechanisms RRM1, . . . , RRMm form electromagnetic resonance coupling.

The individual power reception coils LA1, . . . , LAm of the plurality of power reception circuits 22 exclusively magnetically couple to the plurality of power transmission coils L1, L2, . . . , Ln in a wireless manner. That is, the power transmission coils L1, L2, . . . , Ln and the power reception coils LA1, . . . , LAm are magnetically coupled on a one-to-one basis or a many-to-one basis to form electromagnetic resonance coupling.

According to the present embodiment, power can be used in each of the plurality of power reception circuits 22. The plurality of power reception circuits 22 are set such that the power reception resonance mechanisms resonate at the operating frequency of the power transmission circuit 12. Thus, even when the arrangement of or the distances between the plurality of power reception circuits 22 are changed, stable reception power can be obtained.

Third Embodiment

A third embodiment illustrates an example of the configuration of a plurality of power transmission coils and an example of a positional relationship between the power transmission coils and a power reception coil.

Figure 4:
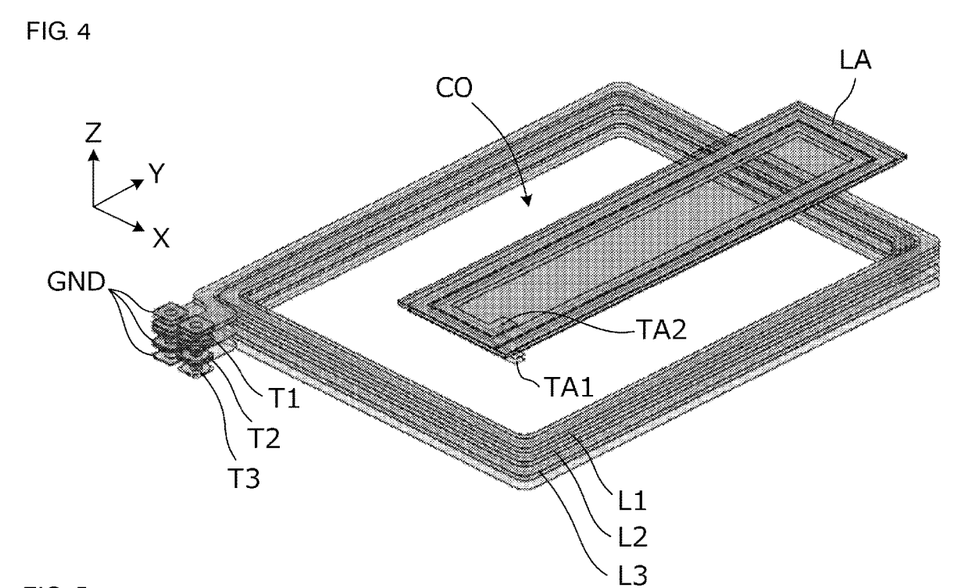
FIG. 4 is a perspective view of power transmission coils and a power reception coil in a wireless power transfer system according to a third embodiment.

FIG. 4 is a perspective view of power transmission coils L1, L2, and L3 and a power reception coil LA in a wireless power transfer system according to the third embodiment. The power transmission coils L1, L2, and L3 are each a rectangular coil with about two turns and are arranged in the Z axis direction so as to have a multilayer state such that openings CO of the power transmission coils L1, L2, and L3 are superposed with each other. One-side ends of the power transmission coils L1, L2, and L3 are ground terminals GND and are connected to ground. The other ends are individual terminals T1, T2, and T3. These terminals T1, T2, and T3 correspond to the terminals T1, T2, and T3 illustrated in FIG. 1. As illustrated in FIG. 1 or the like, the square wave power supply circuit Vin is connected between the ground terminals GND and these terminals T1, T2, and T3 with the power transmission resonant capacitors C1, C2, and C3 interposed therebetween.

The power reception coil LA is a rectangular coil with about two turns and has two terminals TA1 and TA2. The two terminals TA1 and TA2 correspond to the terminals TA1 and TA2 illustrated in FIG. 1.

According to the configuration illustrated in FIG. 4, the power transmission coils L1, L2, and L3 having the same shape are arranged in a multilayer manner. Thus, current that flows to form magnetic flux that passes through the coil openings CO is divided into currents that flow through the respective power transmission coils L1, L2, and L3. Note that the power transmission coils L1, L2, and L3 are wound in the same direction such that the polarity of each mutual inductance becomes positive.

The capacitances of the power transmission resonant capacitors C1, C2, and C3 are adjusted such that electromagnetic resonance coupling is formed in accordance with magnetic coupling determined in accordance with the positional relationship between the power reception coil LA and the power transmission coils L1, L2, and L3 and the shapes of the power transmission coils L1, L2, and L3 and the power reception coil LA. That is, the power transmission coils L1, L2, and L3 are more strongly coupled to each other by being placed close to each other and by being wound in the same direction. As a result, each mutual inductance becomes closer to the self-inductance. Since the power transmission coils L1, L2, and L3 are close to each other, the power transmission coils L1, L2, and L3 have almost the same combined inductances, which are each obtained by combining the self-inductance and the mutual inductance. Based on this, the capacitances of the power transmission resonant capacitors C1, C2, and C3 are determined.

In contrast, the distances between the power reception coil LA and the power transmission coils L1, L2, and L3 are longer than the distances between the power transmission coils L1, L2, and L3. The capacitances of the power transmission resonant capacitors can thus be determined by considering that the power transmission coils L1, L2, and L3 are considered to be at almost the same position when viewed from the power reception coil LA.

Note that the resonant frequency to be set will be shifted if wiring parasitic impedance is present. It is thus preferable that the wiring distances from the power transmission coils L1, L2, and L3 to the power transmission resonant capacitors C1, C2, and C3 be short for implementation.

Figure 5:
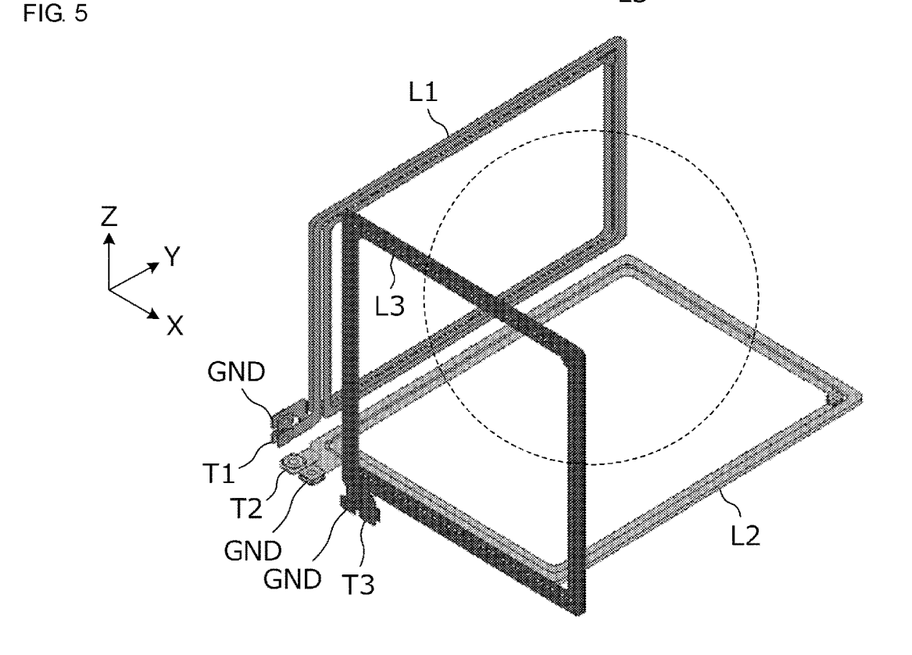
FIG. 5 is a perspective view illustrating an example of another positional relationship between the power transmission coils according to the third embodiment.

FIG. 5 is a perspective view illustrating an example of another positional relationship between the power transmission coils according to the third embodiment. The power transmission coils L1, L2, and L3 are each a rectangular coil with about two turns. The power transmission coil L1 is a coil arranged in the Y-Z plane, and the coil axis corresponds to the X axis direction. The power transmission coil L2 is a coil arranged in the X-Y plane, and the coil axis corresponds to the Z axis direction. The power transmission coil L3 is a coil arranged in the X-Z plane, and the coil axis corresponds to the Y axis direction.

In this manner, by arranging the power transmission coils L1, L2, and L3 in the XYZ planes, a magnetic field having components in the three-axis directions is formed in a spatial region illustrated with a broken line in FIG. 5. Thus, by arranging a power reception coil in this spatial region, the power transmission coils L1, L2, and L3 magnetically couple to the power reception coil. In this case, the orientation of the coil opening of the power reception coil is not fixed and may be freely determined. Thus, the degree of arrangement flexibility of the power reception coil is high.

Fourth Embodiment

A fourth embodiment illustrates a specific example of the configuration of the square wave power supply circuit Vin of a wireless power transfer system and a specific example of the configuration of a rectifying and smoothing circuit of a power reception circuit.

Figure 6:
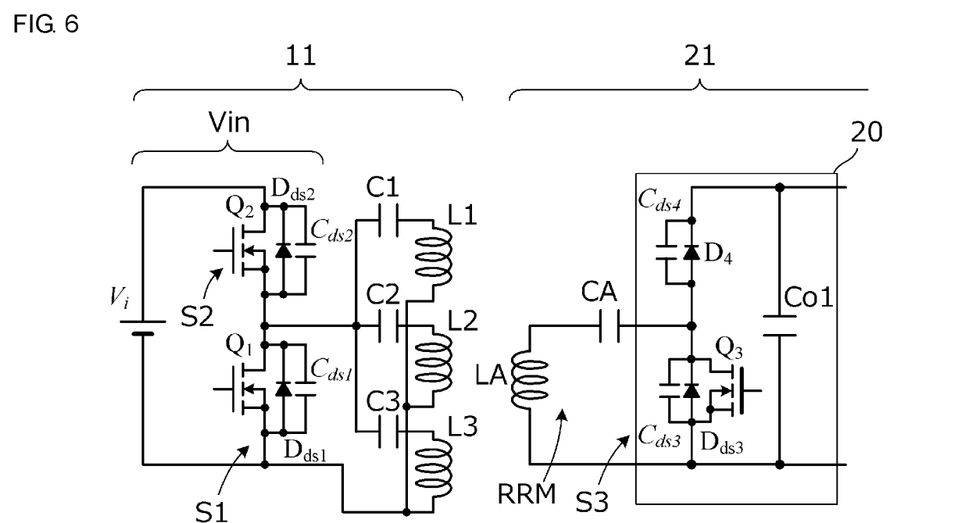
FIG. 6 is a diagram illustrating an example of a first circuit configuration of a portion related to a wireless power transfer system according to a fourth embodiment.

FIG. 6 is a diagram illustrating an example of a first circuit configuration of a portion related to the wireless power transfer system. This example illustrates a circuit in which the power transmission side performs a class-D inverter operation, and the reception side performs a series resonance and voltage doubler rectification operation.

The power transmission circuit 11 includes the square wave power supply circuit Vin, the power transmission coils L1, L2, and L3, and the power transmission resonant capacitors C1, C2, and C3.

The square wave power supply circuit Vin has a direct-current power supply Vi. The square wave power supply circuit Vin has a first switch circuit S1, a second switch circuit S2, and a switching control circuit (not illustrated). The first switch circuit S1 is formed so as to be equivalent to a parallel connection circuit made up of a switching element Q1, a diode Dds1, and a capacitor Cds1. The second switch circuit S2 is formed so as to be equivalent to a parallel connection circuit made up of a switching element Q2, a diode Dds2, and a capacitor Cds2. The switching control circuit controls the switching elements Q1 and Q2. The square wave power supply circuit Vin intermittently operates the direct-current power supply Vi and intermittently and periodically supplies direct-current power to the power transmission resonance mechanisms.

The switching elements Q1 and Q2 are switching elements having a parasitic output capacitance or a parasitic diode and are included in the switch circuits S1 and S2. Examples of the switching elements include a metal oxide semiconductor field-effect transistor (MOSFET).

The switching element Q1 of the first switch circuit S1 and the switching element Q2 of the second switch circuit S2 are turned on and off in an alternating manner.

The switching control circuit of the square wave power supply circuit Vin intermittently applies a direct-current voltage to the power transmission resonant circuit by switching the switching element Q1, which is a first switching element, and the switching element Q2, which is a second switching element, at a predetermined operating frequency, and causes resonance currents to be generated in the power transmission coils L1, L2, and L3. As a result, sinusoidal currents flow through the power transmission coils L1, L2, and L3. Specifically, a switching operation is performed at 13.56 MHz, which is used in NFC communication.

The power reception circuit 21 includes the power reception resonance mechanism RRM and a rectifying and smoothing circuit 20. The power reception resonance mechanism RRM includes the power reception coil LA and the power reception resonant capacitor CA. The rectifying and smoothing circuit 20 includes a switch circuit S3 and a diode D4. The switch circuit S3 is formed so as to be equivalent to a parallel connection circuit made up of a switching element Q3, a diode Dds3, and a capacitor Cds3. The diode D4 has a capacitor Cds4 having a parasitic capacitance.

The switch circuit S3 and the diode D4 rectify a voltage generated at a power reception resonant circuit including the power reception coil LA and the power reception resonant capacitor CA, and the smoothing capacitor Co1 smooths the voltage. In this example, the power reception coil LA and the power reception resonant capacitor CA form a series resonant circuit.

Figure 7:
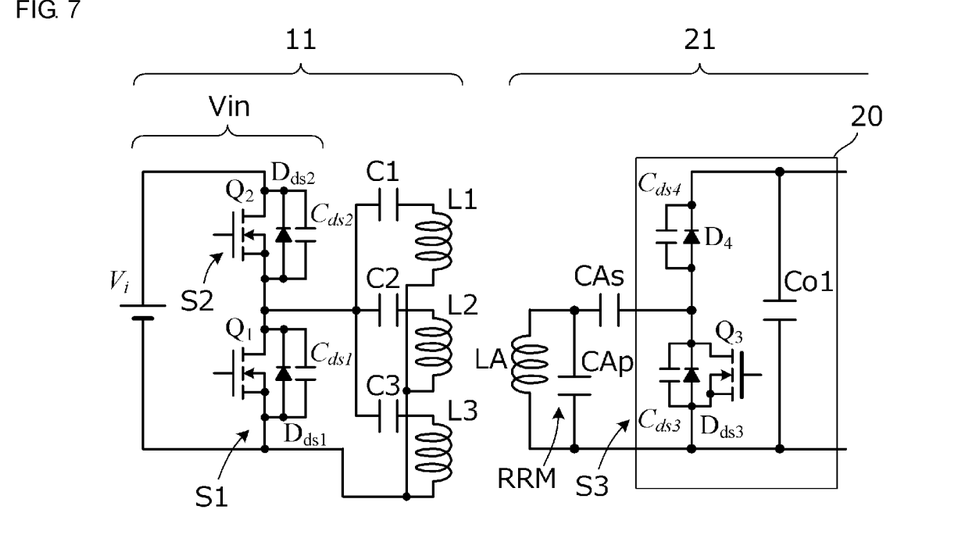
FIG. 7 is a diagram illustrating an example of a second circuit configuration of the portion related to the wireless power transfer system according to the fourth embodiment.

FIG. 7 is a diagram illustrating an example of a second circuit configuration of the portion related to the wireless power transfer system. This example illustrates a circuit in which the power transmission side performs a class-D inverter operation, and the reception side performs a parallel series resonance and voltage doubler rectification operation. The configuration of the power transmission side is the same as that of the example illustrated in FIG. 6. The power reception circuit 21 includes a power reception resonance mechanism RRM and the rectifying and smoothing circuit 20. The power reception resonance mechanism RRM includes the power reception coil LA and power reception resonant capacitors CAs and CAp. The power reception coil LA and the power reception resonant capacitor CAs form a series resonant circuit, and the power reception coil LA and the power reception resonant capacitor CAp form a parallel resonant circuit. The configuration of the rectifying and smoothing circuit 20 is the same as that of the example illustrated in FIG. 6.

Figure 8:
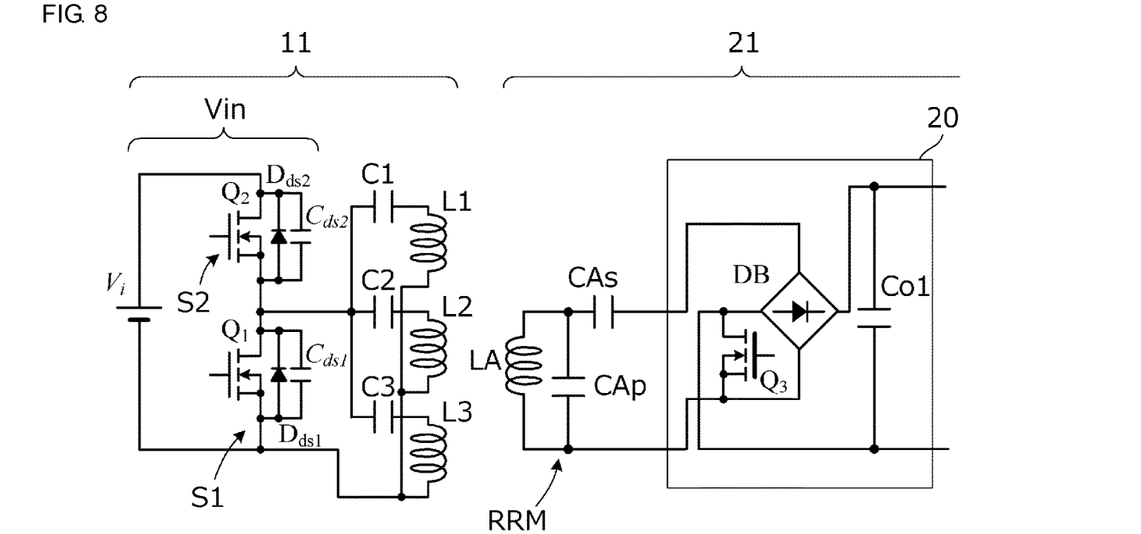
FIG. 8 is a diagram illustrating an example of a third circuit configuration of the portion related to the wireless power transfer system according to the fourth embodiment.

FIG. 8 is a diagram illustrating an example of a third circuit configuration of the portion related to the wireless power transfer system. This example illustrates a circuit in which the power transmission side performs a class-D inverter operation, and the reception side performs a parallel series resonance and full-wave rectification operation. The configuration of the power transmission side is the same as that of the example illustrated in FIG. 6. The power reception circuit 21 includes the power reception resonance mechanism RRM and the rectifying and smoothing circuit 20. The power reception resonance mechanism RRM includes the power reception coil LA and the power reception resonant capacitors CAs and CAp. The power reception coil LA and the power reception resonant capacitor CAs form a series resonant circuit, and the power reception coil LA and the power reception resonant capacitor CAp form a parallel resonant circuit. The rectifying and smoothing circuit 20 includes the diode bridge DB, the switching element Q3, and the smoothing capacitor Co1. The diode bridge DB performs full-wave rectification on the resonance voltage of the power reception resonance mechanism including the power reception coil LA and the power reception resonant capacitors CAs and CAp. When the switching element Q3 is in the ON state, the full-wave rectification operation of the diode bridge DB is stopped, and power reception is stopped.

Figure 9:
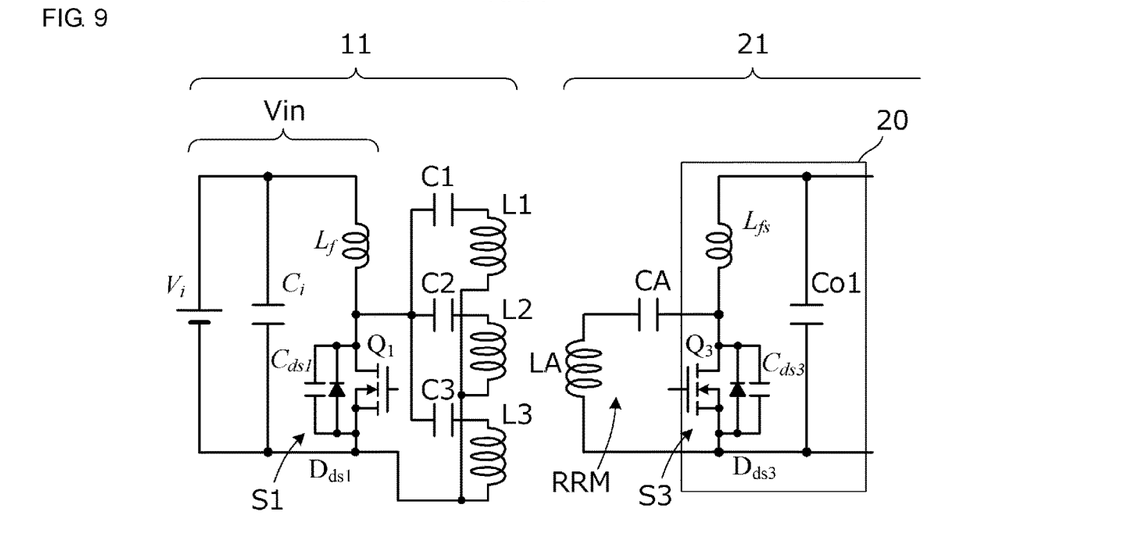
FIG. 9 is a diagram illustrating an example of a fourth circuit configuration of the portion related to the wireless power transfer system according to the fourth embodiment.

FIG. 9 is a diagram illustrating an example of a fourth circuit configuration of the portion related to the wireless power transfer system. This example illustrates a circuit in which the power transmission side performs a class-E inverter operation, and the reception side performs a series resonance and class-E rectification operation.

The square wave power supply circuit Vin has the first switch circuit S1, an inductor Lf, a capacitor Ci, and a switching control circuit (not illustrated). The first switch circuit S1 is formed so as to be equivalent to a parallel connection circuit made up of the switching element Q1, the diode Dds1, and the capacitor Cds1. The switching control circuit controls the switching element Q1.

The switching element Q1 is a switching element having a parasitic output capacitance or a parasitic diode and is included in the switch circuit S1. Examples of the switching element include a MOSFET.

The switching control circuit of the square wave power supply circuit Vin intermittently applies, by switching the switching element Q1 (the first switching element) at a predetermined operating frequency, a direct-current voltage to the inductor Lf and a resonant circuit including the power transmission resonant capacitors C1, C2, and C3 and the power transmission coils L1, L2, and L3, and causes resonance currents to be generated in the power transmission coils L1, L2, and L3.

The power reception circuit 21 includes the power reception resonance mechanism RRM and the rectifying and smoothing circuit 20. The power reception resonance mechanism RRM includes the power reception coil LA and the power reception resonant capacitor CA. The rectifying and smoothing circuit 20 includes the switch circuit S3, an inductor Lfs, and the smoothing capacitor Co1. The switch circuit S3 is formed so as to be equivalent to a parallel connection circuit made up of the switching element Q3, the diode Dds3, and the capacitor Cds3.

The switch circuit S3 rectifies a voltage generated at a power reception resonant circuit including the power reception coil LA, the power reception resonant capacitor CA, and the inductor Lfs, and the smoothing capacitor Co1 smooths the voltage.

Figure 10:
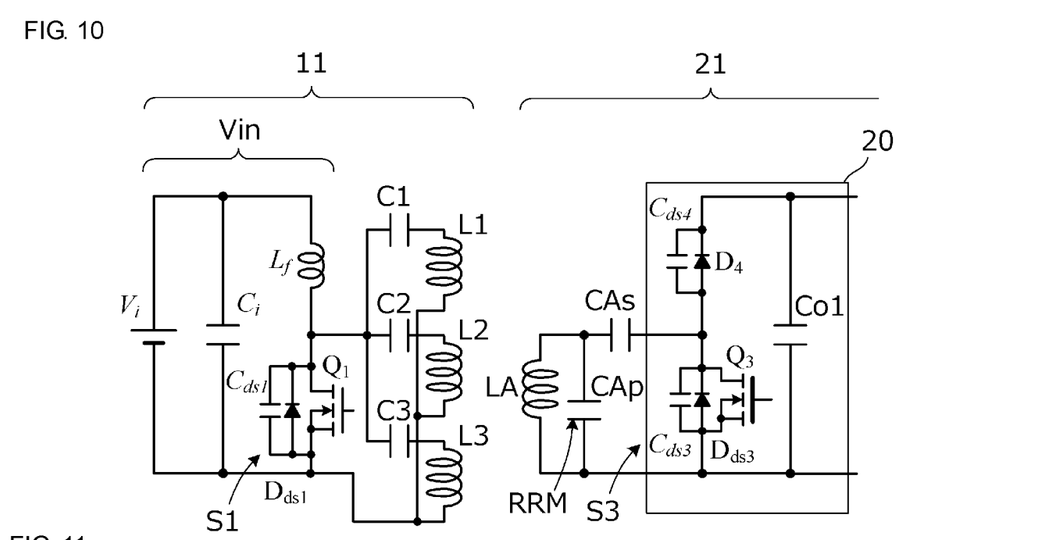
FIG. 10 is a diagram illustrating an example of a fifth circuit configuration of the portion related to the wireless power transfer system according to the fourth embodiment.

FIG. 10 is a diagram illustrating an example of a fifth circuit configuration of the portion related to the wireless power transfer system. This example illustrates a circuit in which the power transmission side performs a class-E inverter operation, and the reception side performs a parallel series resonance and voltage doubler rectification operation.

The configuration of the power transmission circuit 11 is substantially the same as that of the example illustrated in FIG. 9. The configuration of the power reception circuit 21 is substantially the same as that of the example illustrated in FIG. 7.

Figure 11:
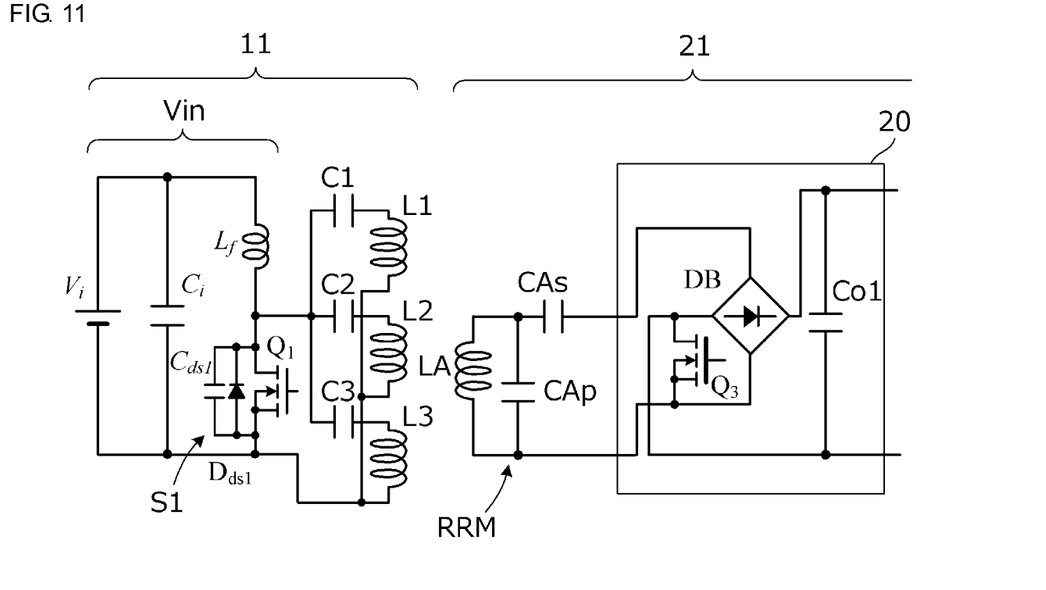
FIG. 11 is a diagram illustrating an example of a sixth circuit configuration of the portion related to the wireless power transfer system according to the fourth embodiment.

FIG. 11 is a diagram illustrating an example of a sixth circuit configuration of the portion related to the wireless power transfer system. This example illustrates a circuit in which the power transmission side performs a class-E inverter operation, and the reception side performs a parallel series resonance and full-wave rectification operation.

The configuration of the power transmission circuit 11 is substantially the same as that of the example illustrated in FIG. 9. The configuration of the power reception circuit 21 is substantially the same as that of the example illustrated in FIG. 8.

As in the examples described above, as the square wave power supply circuit Vin of the power transmission circuit 11, the configuration of a class-D inverter or the configuration of a class-E inverter can be used. Moreover, as the power reception resonance mechanism of the power reception circuit 21, series resonance or parallel series resonance can be used other than parallel resonance illustrated in, for example, FIGS. 1 and 3. Moreover, as the rectifying and smoothing circuit, the configuration of a voltage doubler rectifier circuit or the configuration of a class-E rectifier circuit can be used other than the full-wave rectification circuit.

In the examples illustrated in FIGS. 6 to 11, some combinations of the power transmission circuit 11, the power reception resonance mechanism RPM, and the rectifying and smoothing circuit 20 have been illustrated; however, these are examples, and other combinations are also possible.

Note that, in FIGS. 6 to 11, the wireless power transfer systems having a single power reception circuit 21 have been illustrated; however, the wireless power transfer systems may have a plurality of power reception circuits 22 as illustrated in FIG. 3. The configuration of each power reception resonance mechanism and that of the rectifying and smoothing circuit may be different from those described above.

Lastly, the present disclosure is not limited to the embodiments described above. Those skilled in the art may make modifications and add changes as needed. The scope of the present disclosure is expressed not by the embodiments described above but by the scope of the claims. Furthermore, the scope of the present disclosure includes modifications and changes from embodiments within the scope of equivalents of the claims.

What is claimed is:

1. A wireless power transfer system comprising:
a power transmission circuit that includes a power transmission resonance mechanism including a power transmission coil and a power transmission resonant capacitor; and
at least one power reception circuit that includes a power reception resonance mechanism including a power reception coil that magnetically couples to the power transmission coil and a power reception resonant capacitor, the wireless power transfer system being configured to wirelessly supply power from the power transmission coil to the power transmission coil, wherein
the power transmission circuit includes a parallel connection circuit including a plurality of power transmission resonance mechanisms, which are each the power transmission resonance mechanism,
the power transmission circuit includes a direct-current power supply and a switching circuit, and the switching circuit being configured to intermittently and periodically supply direct-current power from the direct-current power supply to the plurality of power transmission resonance mechanisms, and
the plurality of power transmission resonance mechanisms and the power reception resonance mechanism create electromagnetic resonance coupling, and the power reception resonance mechanism is configured acquire reception power by superposing resonance currents induced by the electromagnetic resonance coupling.

2. The wireless power transfer system according to claim 1, wherein
the power reception resonance mechanism is configured to resonate at a switching frequency of the switching circuit for the direct-current power supply, and the power reception resonant capacitor is set such that a resonance current flows through the power reception circuit.

3. The wireless power transfer system according to claim 2, wherein
the power transmission resonant capacitor includes a capacitor that is an electronic component, the capacitor being adjusted such that the electromagnetic resonance coupling is created in accordance with magnetic coupling determined in accordance with a positional relationship between the power reception coil and the power transmission coils of the plurality of respective power transmission resonance mechanisms and the shapes of the power transmission coils and the power reception coil.

4. The wireless power transfer system according to claim 3, wherein
at least two power transmission coils among the power transmission coils of the plurality of power transmission resonance mechanisms are configured to magnetically couple to each other to form mutual inductance.

5. The wireless power transfer system according to claim 4, wherein
the at least one power reception circuit includes a plurality of the power reception circuits, and the individual power reception coils of the respective power reception circuits are configured to exclusively magnetically couple to the power transmission coils of the plurality of power transmission resonance mechanisms in a wireless manner.

6. The wireless power transfer system according to claim 3, wherein
the at least one power reception circuit includes a plurality of the power reception circuits, and the individual power reception coils of the respective power reception circuits are configured to exclusively magnetically couple to the power transmission coils of the plurality of power transmission resonance mechanisms in a wireless manner.

7. The wireless power transfer system according to claim 2, wherein
at least two power transmission coils among the power transmission coils of the plurality of power transmission resonance mechanisms are configured to magnetically couple to each other to form mutual inductance.

8. The wireless power transfer system according to claim 7, wherein
the at least one power reception circuit includes a plurality of the power reception circuits, and the individual power reception coils of the respective power reception circuits are configured to exclusively magnetically couple to the power transmission coils of the plurality of power transmission resonance mechanisms in a wireless manner.

9. The wireless power transfer system according to claim 2, wherein
the at least one power reception circuit includes a plurality of the power reception circuits, and the individual power reception coils of the respective power reception circuits are configured to exclusively magnetically couple to the power transmission coils of the plurality of power transmission resonance mechanisms in a wireless manner.

10. The wireless power transfer system according to claim 1, wherein
the power transmission resonant capacitor includes a capacitor that is an electronic component, the capacitor being adjusted such that the electromagnetic resonance coupling is created in accordance with magnetic coupling determined in accordance with a positional relationship between the power reception coil and the power transmission coils of the plurality of respective power transmission resonance mechanisms and the shapes of the power transmission coils and the power reception coil.

11. The wireless power transfer system according to claim 10, wherein
at least two power transmission coils among the power transmission coils of the plurality of power transmission resonance mechanisms are configured to magnetically couple to each other to form mutual inductance.

12. The wireless power transfer system according to claim 11, wherein
the at least one power reception circuit includes a plurality of the power reception circuits, and the individual power reception coils of the respective power reception circuits are configured to exclusively magnetically couple to the power transmission coils of the plurality of power transmission resonance mechanisms in a wireless manner.

13. The wireless power transfer system according to claim 10, wherein
the at least one power reception circuit includes a plurality of the power reception circuits, and the individual power reception coils of the respective power reception circuits are configured to exclusively magnetically couple to the power transmission coils of the plurality of power transmission resonance mechanisms in a wireless manner.

14. The wireless power transfer system according to claim 1, wherein
at least two power transmission coils among the power transmission coils of the plurality of power transmission resonance mechanisms are configured to magnetically couple to each other to form mutual inductance.

15. The wireless power transfer system according to claim 14, wherein
the at least one power reception circuit includes a plurality of the power reception circuits, and the individual power reception coils of the respective power reception circuits are configured to exclusively magnetically couple to the power transmission coils of the plurality of power transmission resonance mechanisms in a wireless manner.

16. The wireless power transfer system according to claim 1, wherein
the at least one power reception circuit includes a plurality of the power reception circuits, and the individual power reception coils of the respective power reception circuits are configured to exclusively magnetically couple to the power transmission coils of the plurality of power transmission resonance mechanisms in a wireless manner.

17. The wireless power transfer system according to claim 1, wherein
the at least one power reception circuit further includes a diode bridge, a DC-DC converter coupled between the diode bridge and a load, a first smoothing capacitor coupled between the diode bridge and the DC-DC converter, and a second smoothing capacitor coupled between the DC-DC converter and the load; and
the power reception resonant capacitor is coupled to the power reception coil between the power reception coil and the diode bridge.

\* \* \* \* \*